United States Patent [11] 3,628,949

[72] Inventor Teh Po Wang
 Cedar Grove, N.J.
[21] Appl. No. 885,588
[22] Filed Dec. 16, 1969
[45] Patented Dec. 21, 1971
[73] Assignee Wilbur B. Driver Company

[54] THERMOCOUPLE EXTENSION WIRE
 1 Claim, 1 Drawing Fig.
[52] U.S. Cl................................................ 75/159,
 75/153, 75/161, 136/241
[51] Int. Cl............................................. C22c 9/06,
 H01v 1/14
[50] Field of Search............................................. 75/153,
 159; 136/241

[56] References Cited
 UNITED STATES PATENTS
1,346,190 7/1920 Fahrenwald.................. 75/159
3,017,269 1/1962 Finch et al..................... 75/159
 FOREIGN PATENTS
625,523 8/1961 Canada......................... 75/159

*Primary Examiner*—Charles N. Lovell
*Attorneys*—Norman J. O'Malley and Theodore C. Jay, Jr.

ABSTRACT: A thermocouple extension wire composition comprising, as expressed in percent by weight; nickel 16–20 percent; manganese 1.30–2.00 percent; cobalt 0.70–1.70 percent; balance copper.

A pair of thermocouple extension wires, one wire having the above composition, the other wire being composed essentially of iron, exhibit a differential electromotive force substantially equal to the electromotive force developed by Type K thermocouple between 32° to 400° F.

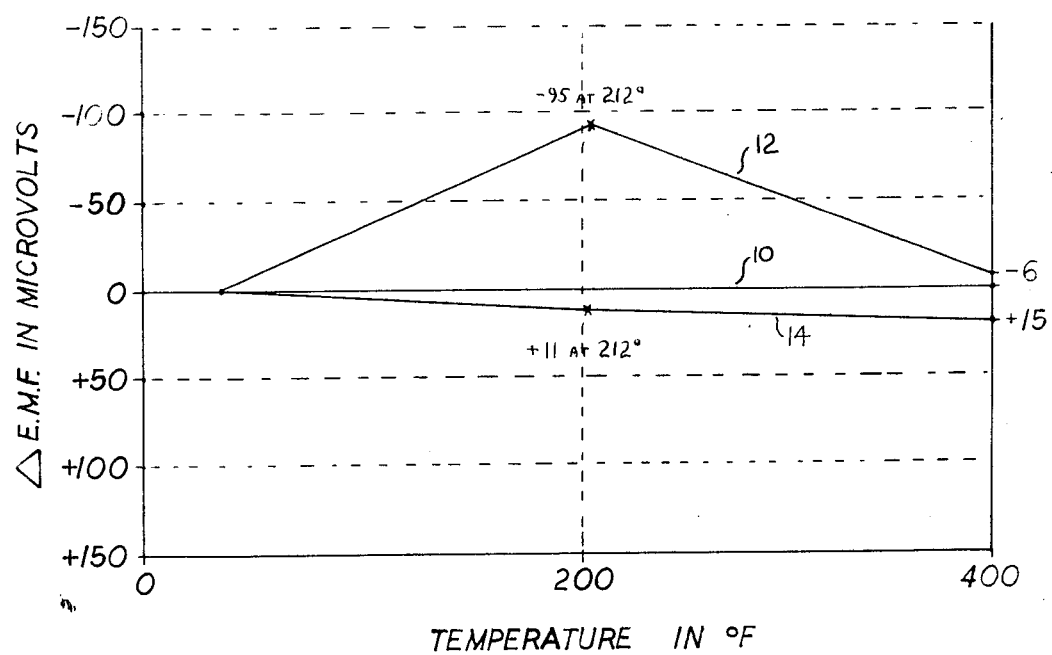
INVENTOR.
TEH PO WANG

THERMOCOUPLE EXTENSION WIRE

BACKGROUND OF THE INVENTION

Thermocouples are commonly employed in high temperature measurement and control. One such thermocouple employs an alloy containing 95 percent nickel, balance small amounts of manganese, aluminum, silicon and cobalt as the negative thermoelement and an alloy of 10 percent chromium, balance essentially nickel as the positive thermo-element. This thermocouple is known as a Type K thermocouple.

Thermocouples are usually spaced from the measurement or control instrumentation by distances which can be 6 feet or more, and thus extension wires are used to connect the thermocouples to the instrumentation. Because of the high cost of nickel and nickel based alloys, extension wires for Type K thermocouples can be composed of less expensive metals or alloys.

It is well known to use as extension wires, for the Type K thermocouple, an iron wire as the positive thermocouple extension wire and a copper-nickel alloy wire as the negative thermocouple extension wire. This last named alloy contains about 16 percent nickel, balance copper.

In the normal installation, the thermocouples are connected to a header junction, and the extension wires are connected between the junction and the instrumentation. In most industrial applications, the temperature of the header junction will not exceed 400° F. while the temperature at the instrumentation will not fall below 32° F.

Ideally, to avoid inaccuracy, the extension wires and the thermocouple should have matched thermoelectric characteristics at which the differential electromotive force (EMF) developed between the two extension wires should be equal, both in polarity and magnitude, to the differential EMF developed between the two thermocouple wires at any temperature within the range 32° F. to 400° F.

I have found that the use of copper-nickel alloy wire as a negative thermocouple extension wire together with an iron wire as the positive thermocouple extension wire does not provide an ideal match for Type K thermocouples.

In my invention, I employ a new alloy composition for the negative extension wire which, when used together with an iron wire as the positive extension, produces a much better match for Type K thermocouples.

SUMMARY OF THE INVENTION

In accordance with my invention, a negative thermocouple extension wire comprises, as expressed in percent by weight: 16–20 percent nickel; 1.30–2.00 percent manganese; 0.70–1.70 percent cobalt; balance copper. Small amounts of deoxidizers selected from the class consisting of boron, magnesium and silicon can be added to this composition.

The differential EMF between an iron wire used as the positive thermocouple extension wire and my negative thermocouple extension wire, as measured over the temperature range 32° F. to 400° F. is substantially matched with the EMF's generated by Type K thermocouples.

BRIEF DESCRIPTION OF THE DRAWING

The accompanying Figure is a graph showing the match between the differential EMF's of my invention and a Type K couple as a function of temperature in comparison with the existing copper-nickel alloy.

DETAILED DESCRIPTION OF PREFERRED EMBODIMENTS

My negative extension wire comprises 16–20 percent nickel; 1.30–2.00 percent manganese; 0.70–1.70 percent cobalt; balance copper. A first illustrative composition is 18 percent nickel; 1.35 percent manganese; 0.90 percent cobalt; balance copper, which can also contain, as deoxidizers, 0.04 percent silicon, 0.03 percent magnesium and 0.01 percent boron.

In the Figure, curve 10 illustrates the temperature-EMF characteristics of a Type K thermocouple; curve 12 illustrates the temperature-EMF characteristic of the prior art combination of positive and negative extension wires; and curve 14 illustrates the temperature-EMF characteristic of the combination of an iron positive extension wire and my alloy as the negative extension wire.

It is thus apparent from this Figure that curve 14 provides a much improved match with curve 10 as compared to the match obtained between curves 12 and 10.

What is claimed is:

1. A thermocouple lead wire composition consisting essentially of as expressed in percent by weight:

| | |
|---|---|
| Nickel | 16%–20% |
| Manganese | 1.30%–2.00%; |
| Cobalt | 0.70%–1.70%; and |
| Balance | Copper |

* * * * *